United States Patent
Gutierrez

(10) Patent No.: US 7,659,712 B2
(45) Date of Patent: *Feb. 9, 2010

(54) SYSTEM AND METHOD FOR PROCESS MEASUREMENT

(75) Inventor: Francisco M. Gutierrez, League City, TX (US)

(73) Assignee: Dresser, Inc., Addison, TX (US)

( * ) Notice: Subject to any disclaimer, the term of this patent is extended or adjusted under 35 U.S.C. 154(b) by 796 days.

This patent is subject to a terminal disclaimer.

(21) Appl. No.: 10/964,375

(22) Filed: Oct. 13, 2004

(65) Prior Publication Data

US 2006/0076948 A1   Apr. 13, 2006

(51) Int. Cl.
*G01B 7/14* (2006.01)

(52) U.S. Cl. .................. 324/207.13; 324/228

(58) Field of Classification Search ............ 324/228, 324/207.13; 73/861.74–861.75, 861.77–861.79
See application file for complete search history.

(56) References Cited

U.S. PATENT DOCUMENTS

| | | | |
|---|---|---|---|
| 3,820,090 | A | 6/1974 | Wiegand |
| 4,319,151 | A | 3/1982 | Klotz et al. |
| 4,579,008 | A | 4/1986 | Boehm et al. |
| 5,530,298 | A | 6/1996 | Gerhold |
| 6,084,400 | A | 7/2000 | Steinich et al. |
| 6,604,434 | B1 | 8/2003 | Hamilton et al. |
| 6,612,188 | B2 * | 9/2003 | Hamilton ............. 73/861.78 |
| 6,886,414 | B2 * | 5/2005 | Gutierrez et al. ......... 73/861.78 |
| 2003/0020466 | A1 | 1/2003 | Lewis | |
| 2004/0123656 | A1 | 7/2004 | Castleberry et al. | |

FOREIGN PATENT DOCUMENTS

| | | |
|---|---|---|
| DE | 197 14 351 A1 | 10/1998 |
| EP | 0 343 373 A | 11/1989 |

OTHER PUBLICATIONS

International Search Report and The Written Opinion of the International Searching Authority; Joanna Marnell; Jun. 21, 2006; Patent Cooperation Treaty International Searching Authority.
Notification of Transmittal of the International Preliminary Report on Patentability (1 page), International Preliminary Report on Patentability (7 pages) and Amended Sheets (4 pages) for International Application No. PCT/US2005/036028, mailed Jan. 11, 2007.

* cited by examiner

*Primary Examiner*—Reena Aurora
(74) *Attorney, Agent, or Firm*—Fish & Richardson P.C.

(57) ABSTRACT

Process measurement may be achieved by systems and techniques generating output signals based on the measured process. In certain implementations, process measurement systems and techniques may include the ability to generate a magnetic field and successively change the orientation of the magnetic field. The systems and techniques may also include the ability to sense the presence of at least a first orientation of the magnetic field with a magnetic field sensor including a conductor and at least two Wiegand-effect conductors as the magnetic field orientation is changed and to generate an electrical pulse in the conductor with each Wiegand-effect conductor when the first orientation of the magnetic field is sensed.

39 Claims, 2 Drawing Sheets

SYSTEM AND METHOD FOR PROCESS MEASUREMENT

TECHNICAL FIELD

This description relates to process management and, more particularly, to process measurement.

BACKGROUND

Process measurement devices and techniques are used in a wide variety of environments for commercial and industrial applications. For example, process measurement devices and techniques may be used for monitoring pressure, temperature, and/or flow rate in pipelines or storage facilities. In many of these environments and applications, it is not uncommon for a process measurement device or technique to have difficulty in accessing an external power supply. Also, for environments and applications that require intrinsically safe devices or techniques, external power supplies are commonly disfavored. Thus, process measurement devices and techniques that do not require an external power supply are often quite beneficial.

Process measurement devices and techniques may generate their own power by any of a variety of methods. For example, a process measurement device may have an internal power supply (e.g., a battery). As another example, a process measurement device may generate power from the measured process, by using a small amount of momentum, for instance.

SUMMARY

Process measurement may be achieved by generating output signals based on the measured process. In one general aspect, a system for process measurement may include a magnetic field generating system and a magnetic field sensor. The magnetic field generating system may be operable to generate a magnetic field and successively change the orientation of the magnetic field, and the magnetic field sensor may be operably positioned to sense the presence of at least a first orientation of the magnetic field as the magnetic field orientation is changed by the magnetic field generating system. The magnetic field sensor may include at least two Wiegand-effect conductors operably positioned relative to a conductor to each generate an electrical pulse in the conductor when the first orientation of the magnetic field is sensed. In certain implementations, the conductor may be a coiled conductor, and the Wiegand-effect conductors may be positioned within the coiled conductor.

The magnetic field generating system may include a magnetic field generator and a driving element. The magnetic field generator may be operable to generate a magnetic field, and the driving element may be coupled to the magnetic field generator and operable to change the orientation of the magnetic field generator. The magnetic field generator may, for example, be a polarized ring magnet, and the magnetic field sensor may be located within the ring magnet. The driving element may, for example, be an impeller shaft for a gas meter. The magnetic field generator may be mounted transversally to the shaft.

The system also may include a storage device coupled to the magnetic field sensor. The storage device may be operable to accumulate the electrical pulses generated is 5 by the sensing of the first magnetic field orientation. The storage device may, for example, be a capacitor. In certain implementations, the magnetic field sensor may be operable to sense the presence of a second orientation of the magnetic field as the magnetic field orientation is changed by the magnetic field generating system and to generate an electrical pulse in the conductor with each Wiegand-effect conductor when the second orientation of the magnetic field is sensed. The storage device may be discharged by at least one of the pulses generated by the sensing of the second orientation of the magnetic field. The first orientation and the second orientation may be opposites.

In another general aspect, a method for process measurement may include generating a magnetic field and successively changing the orientation of the magnetic field. Successively changing the orientation of the magnetic field may, for example, include changing the orientation of a magnetic field generator. The method also may include sensing the presence of at least a first orientation of the magnetic field with a magnetic field sensor including a conductor and at least two Wiegand-effect conductors as the magnetic field orientation is changed and generating an electrical pulse in the conductor with each Wiegand-effect conductor when the first orientation of the magnetic field is sensed. The method may be accomplished by any appropriate electromagnetic system.

In certain implementations, the method may include accumulating the electrical pulses generated by the sensing of the first orientation of the magnetic field. The method also may include sensing the presence of a second orientation of the magnetic field with the magnetic field sensor as the magnetic field orientation is changed and generating an electrical pulse in the conductor with each Wiegand-effect conductor when the second orientation of the magnetic field is sensed. The accumulated pulses may be discharged in response to at least one of the pulses generated by the sensing of the second orientation of the magnetic field.

In a certain general aspect, a system for process measurement may include a magnetic field generator, a driving element, a magnetic field sensor, and a storage device. The magnetic field generator may be operable to generate a polar magnetic field, and the driving element may be coupled to the magnetic field generator and operable to successively change the orientation of the magnetic field generator. The magnetic field sensor operably may be positioned to sense the presence of at least a first and a second orientation of the magnetic field as the magnetic field orientation is changed. The magnetic field sensor may include at least two Wiegand-effect conductors operably positioned in a coiled conductor to each generate an electrical pulse in the coiled conductor when the first orientation and when the second orientation of the magnetic field is sensed. The storage device may be coupled to the magnetic field sensor and operable to accumulate the electrical pulses generated by the sensing of the first orientation of the magnetic field. The storage device may be discharged by at least one of the electrical pulses generated by the sensing of the second orientation of the magnetic field.

The process measurement techniques have a variety of features, although not all are necessarily applicable to every implementation. For example, a process measurement system or method may generate signals representative of a measured process parameter without using an external power supply, or, for that matter, an internal power supply. This allows the system or method to be used in remote, inaccessible, and/or dangerous locations. As another example, the amplitude of the generated pulses, from which the output signal may be formed, does not have to fluctuate with the value of the measured process parameter. This provides for more reliable measurement at low and high process parameter values. As an additional example, a system or method may generate multiple pulses for each output signal. The multiple pulses may, for example, be combined together to produce a more detectable output signal or used to corroborate each other.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Process measurement may be accomplished by generating output signals based on process flow. For example, the period between output signals may be indicative of flow rate. Each output signal may be composed of multiple pulses generated during the period between the output signals. The generated pulses may also have other uses.

Figure 1:
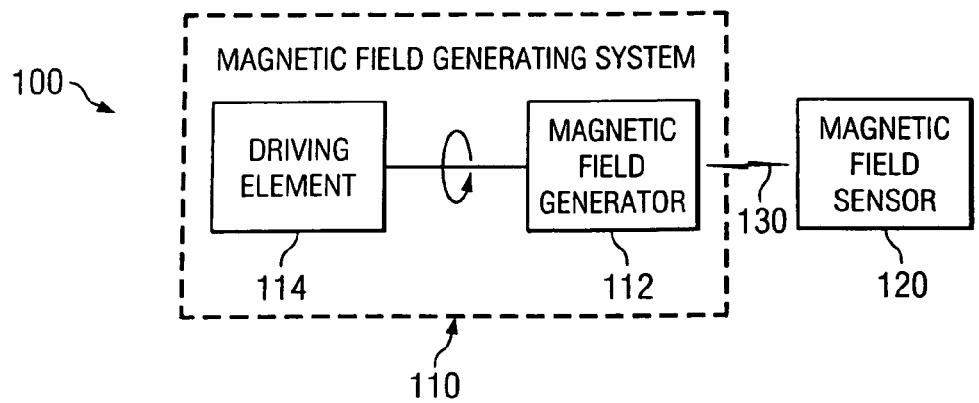
FIG. 1 is a block diagram illustrating one example of a process measurement system.

FIG. 1 illustrates a process measurement system 100. System 100 is responsive to fluid flow to generate output signals indicative of fluid flow rate. The fluid may be a gas, a liquid, or a combination thereof. The period between output signals is indicative of the fluid flow rate.

System 100 includes a magnetic field generating system 110 and a magnetic field sensor 120. Magnetic field generating system 110 generates a magnetic field 130 and varies its orientation in response to fluid flow. Magnetic field sensor 120 senses the orientation of magnetic field 130 and produces multiple pulses for sensed variances in orientation. One or more of the pulses may correspond to an output signal. In general, there is little difference between a pulse and a signal; this nomenclature is used primarily for the sake of clarity.

In more detail, magnetic field generating system 110 includes a magnetic field generator 112 and a driving element 114. Magnetic field generator 112 may be a bar magnet, a coiled conductor that is energized (e.g., a solenoid), or any other appropriate magnetic field generating device. Driving element 114 physically alters the orientation of magnetic field generator 112, which alters the orientation of magnetic field 130. In certain implementations, driving element 114 may be a process-driven member (e.g., a shaft of an impeller in a gas meter) and alter the orientation of magnetic field 130 in a cyclic manner. In other implementations, the orientation of magnetic field 130 may be altered in any other appropriate successive manner (e.g., binary).

Magnetic field sensor 120 includes two or more Wiegand-effect conductors and an associated conductor. Each Wiegand-effect conductor is operably positioned to sense magnetic field 130 and to generate a first electric field when a first orientation of magnetic field 130 is sensed and a second electric field when a second orientation of magnetic field 130 is sensed. The orientations at which the electric fields are generated may be opposites. In particular implementations, the Wiegand-effect conductors may be separated from each other. In other implementations, the Wiegand-effect conductors may partially touch each other. In general, any arrangement of Wiegand-effect conductors may be used as long as the Wiegand-effect conductors do not behave as a single, uniform body. The associated conductor, which may include a coil in some implementations, is operable to generate an electrical pulse in response to each of the first generated electric fields and an electrical pulse in response to each of the second generated electric fields. The generation of an electric field when a particular orientation is sensed may occur as soon as the orientation is sensed, a short time after the orientation is sensed, or at any other appropriate time. In particular implementations, the first orientation and the second orientation may be opposites. The first and second electric fields may also be opposites.

A Wiegand-effect conductor is a conductor that has a non-uniform magnetic density between its core and its outer shell. Such a conductor may, for example, be formed by cold working a 0.01 inch diameter Vicalloy wire. Vicalloy is a ferromagnetic material composed of iron, cobalt, and vanadium. The conductor is formed such that it generates a gradient of higher coercivity at the work-hardened surface to lower coercivity at the relatively soft center. The coercivity levels may be identified as two distinct areas when the wire is sectioned through the diameter—an outer "shell" and an inner "core".

In one mode of operation, magnetic switching occurs in the shell and the core of a Wiegand-effect conductor when it is in the presence of changing longitudinal magnetic field. When subjected to a first orientation of the magnetic field, the Wiegand-effect conductor stores energy. Switching to a second magnetic field orientation causes the Wiegand-effect conductor to generate an electric field to discharge the stored energy. The generated electric field induces a voltage across the associated conductor. In particular implementations, the pulse may be approximately twenty microseconds in duration. The amplitude of the pulse may vary depending on the strength of the changing magnetic field. The duration of the pulse may vary with the diameter of the Wiegand-effect conductor. When the orientation of the magnetic field switches back to the first orientation, a opposite voltage is induced across the associated conductor.

The number of pulses induced on the associated conductor may be directly proportional to the number of Wiegand-effect conductors in magnetic field sensor 120. That is, if there are two such conductors, there may be two pulses, and if there are three such conductors, there may be three pulses.

Figure 2:
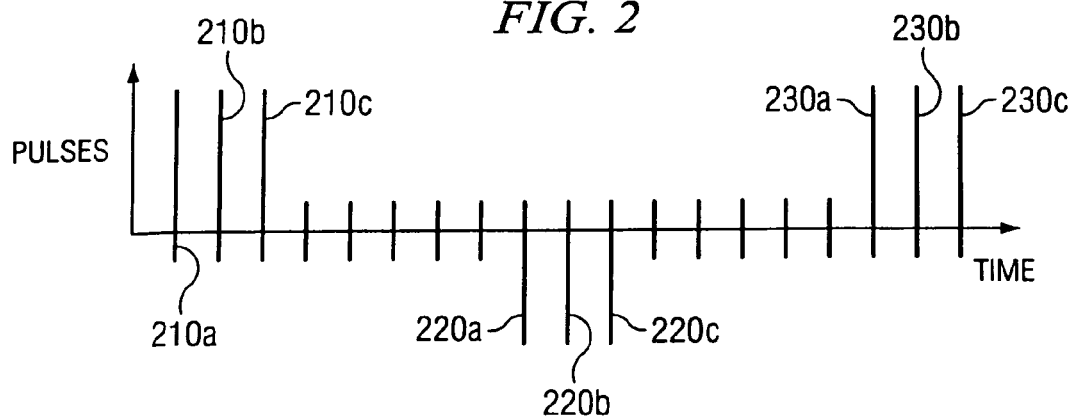
FIG. 2 is a graph illustrating the output of a particular implementation of the process measurement system of FIG. 1.

FIG. 2 illustrates the pulses obtained when magnetic field sensor 120 has three Wiegand-effect conductors and is operable to sense two magnetic field orientations. Pulses 210 are generated for a first orientation of magnetic field 130, pulses 220 are generated for a second orientation of magnetic field 130, and pulses 230 are generated for the first orientation of magnetic field 130. Thus, pulses 210 and pulses 220 may be the pulses generated during one cycle of magnetic field 130, and pulses 230 may be pulses for a new cycle. The timing of the pulses generated for a particular magnetic field orientation may be dictated by the location and/or orientation of the Wiegand-effect conductors relative to the varying magnetic field. Magnetic field generating system 110 may be designed such that the fastest orientation change in a particular application does not result in magnetic field orientation variances at the magnetic field sensor more frequent than the minimum output duration required by the particular application.

In a particular mode of operation, due to being driven by driving element 114, magnetic field generator 112 applies one polarity of magnetic field 130 to magnetic field sensor 120 and then the opposite polarity of magnetic field 130 to the magnetic field sensor in the course of making a cycle. The first polarity causes the magnetic field sensor to generate positive pulses, and the second polarity causes the magnetic field sensor to generate negative voltage pulses. The pulses may, for example, be twenty microseconds in duration. The magnetic field sensor may successively sense the first polarity and the second polarity, which are examples of orientations, and generate the associated pulses as the magnetic field continues to cycle.

Process measurement system 100 has a variety of features. For example, the system can generate process measurement signals without using an external power supply. Also, the amplitude of the generated signals does not have to fluctuate with the value of the process parameter. This provides for more ready measurement in remote, extreme, and/or dangerous environments and at low and high process parameter values. As another example, the system can generate multiple pulses for each sensing of a particular magnetic field orientation. The multiple pulses can be combined together to produce a more detectable output signal, discussed in more detail below, used to corroborate each other, or used to produce any other appropriate effect.

The ability to generate pulses with multiple Wiegand-effect conductors in a magnetic field sensor for a particular magnetic field orientation is not only a feature of system 100, it is also a rather unexpected result. Locating multiple Wiegand-effect conductors in a sensor has been thought a potentially performance degrading proposition due to interference between the magnetic fields of the Wiegand-effect conductors. Also, since the duration of a pulse is related to the diameter of the Wiegand-effect conductor, adding additional Wiegand-effect conductors in a sensor has been thought only possibly effective in producing a longer signal pulse, assuming the interference drawback could be overcome. A variety of tests, however, have shown that pulses may be produced with multiple Wiegand-effect conductors in a sensor for a particular magnetic field orientation. Moreover, as discussed herein, these pulses have been found to have several useful applications.

Although FIG. 1 illustrates one implementation of a process measurement system, other implementations may include fewer, additional, and/or a different arrangement of components. For example, a process measurement system may not have a driving element. In some of these implementations, for instance, a magnetic field generator may be able to alter the orientation of its magnetic field, possibly through control of an electrical supply. As another example, a process measurement system may have a transmission device for sending representations of pulses. As an additional example, a process measurement system may include components to process and/or analyze the pulses.

In particular implementations, for instance, magnetic field sensor 120 may output the pulses generated from sensing a particular magnetic field orientation to a capacitor, which is one type of storage device. Each pulse output by the magnetic field sensor may build up charge on the capacitor, and the capacitor's discharge time and current is directly related to the amount of charge on the capacitor by the following equation:

$$I = I_o e^{-t/RC}.$$

Thus, if the total charge stored on the capacitor is not above a certain threshold, the output pulse will be of a shorter time period and current than expected. Outputting more pulses from magnetic field sensor 120 may increase the charge on the capacitor.

Figure 3:
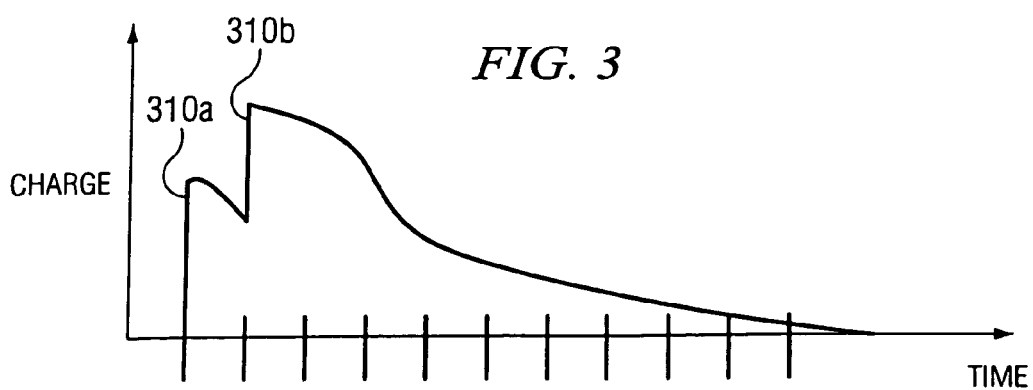
FIG. 3 is a graph illustrating the effect of a particular implementation of the process measurement system of FIG. 1.

FIG. 3 illustrates the charge presented to the capacitor for a sensor having two Wiegand-effect conductors and, hence, two pulses 310 for an orientation of magnetic field 130. As can be seen, the amount of charge presented due to pulses 310 is double the amount due to pulse 310a alone. Therefore, by controlling the number of Wiegand-effect wires in the magnetic field sensor, the amount of charge on the capacitor may be controlled.

There may be pulse amplitude variations with Wiegand-effect conductors. For example, pulse amplitudes may vary based on temperature because temperature may affect the properties of the Wiegand-effect conductor and/or a magnet. Thus, using pulse amplitudes that are greater (e.g., twice as large) than the minimum pulse amplitudes necessary to build the correct amount of charge on the capacitor may be desirable. This could, for example, proportionally increase the probability of having enough charge on the capacitor even when a Wiegand-effect pulse drops to a smaller amplitude. The redundancy in these pulses can be viewed as a correlation of a pulse itself or as a coherent pulse.

In some of these implementations, the pulses generated by the second magnetic field orientation may be used to discharge the capacitor. For example, a metal-oxide semiconductor field-effect transistor (MOSFET) may be included between the associated conductor and the capacitor, with the source of the MOSFET coupled to associated conductor. The MOSFET may include an internal diode between the drain and source terminals such that conduction will occur when the source is positive with respect to the drain, and this diode may conduct positive output pulses generated by magnetic field sensor 120. Positive pulses may serve to charge the capacitor, and negative pulses may serve to discharge the capacitor. A diode may ensure that no negative charge accumulates in the capacitor, as this may counteract the next positive pulse cycle. The diode may serve to clamp the negative "reset" pulse from the magnetic field sensor so that it will not interfere with the next positive "set" pulse from the magnetic field sensor when the magnetic field orientation is being varied quickly. Also in this regard, the negative output pulses may be designed to provide a forced end of the output timing pulse, by, for example, discharging the capacitor, and avoid the capacitor from holding the timing pulse over for too long of a time period. This may also avoid a ramp type of output cutoff. In certain implementations, the negative pulses could also be accumulated for storage. Thus, the negative pulses produced by the sensor may also be utilized.

Although discussed in the context of power generation, process measurement system 100 may have a variety of other applications. System 100 may, for example, be used for encoding or modulation. By varying the number of Wiegand-effect conductors between systems similar to system 100, a determination may be made as to which system is producing a signal (e.g., by counting pulses), one form of encoding. Or, for example, the number of pulses may represent a piece of data (e.g., a number or a letter), another form of encoding. The pulses generated by system 100 may also be used for modulating a signal (e.g., a sine wave). For instance, the spacing between pulses may be used to shift a sine wave.

Figure 4:
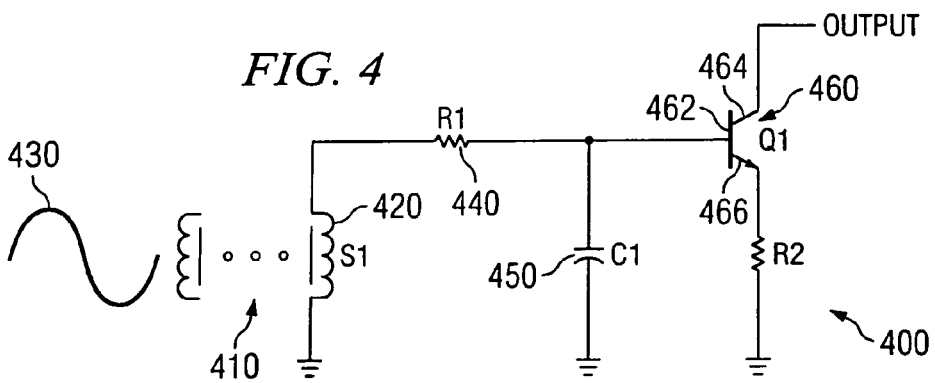
FIG. 4 is a schematic diagram illustrating one example of the process measurement system of FIG. 1.

FIG. 4 illustrates one example of a magnetic field sensor 400. Magnetic field sensor 400 may, in general, represent one implementation of magnetic field sensor 120 of system 100, except that magnetic field sensor 400 can accumulate pulses.

Magnetic field sensor 400 includes a number of Wiegand-effect conductors 410 and a coiled conductor 420. Each Wiegand-effect conductor 410 is operably positioned relative to an orientation-varying magnetic field 430 to generate a first electric field when a first orientation of magnetic field 430 is sensed and a second electric field when a second orientation of magnetic field 430 is sensed. Coiled conductor 420 is operable to generate electrical pulses in response to the first generated electric fields and electrical pulses in response to the second generated electric fields. The pulses generated by coiled conductor 420 in response to the first electric fields may be opposite of the pulses generated by the coiled conductor in response to the second electric fields. The pulses generated by the coiled conductor in response to a particular set of electric fields may be individual pulses or combined into one or more larger pulses.

In certain implementations, coiled conductor 420 acts to sense and amplify the signals from Wiegand-effect conductors 410. The number of turns of coiled conductor 420 may determine the amplification. In particular implementations, the number of turns may be on the order of several thousand.

Magnetic field sensor 400 also includes a resistor 440, a capacitor 450, and a transistor 460. Capacitor 450 is responsible for accumulating the pulses from conductor coil 420, and resistor 440 and capacitor 450 are responsible for determining the charging time of capacitor 450. Transistor 460 includes a gate 462, a source 464, and a drain 466. Capacitor 450 is tied to gate 462, and drain 466 is tied to ground. The output signal is sent through source 464.

In certain modes of operation, transistor 460 may turn on as capacitor 450 reaches a certain voltage (e.g., 0.7 V). Transistor 460 may stay on until capacitor 450 discharges or a negative pulse from conductor coil 420 discharges capacitor 450.

Figure 5:
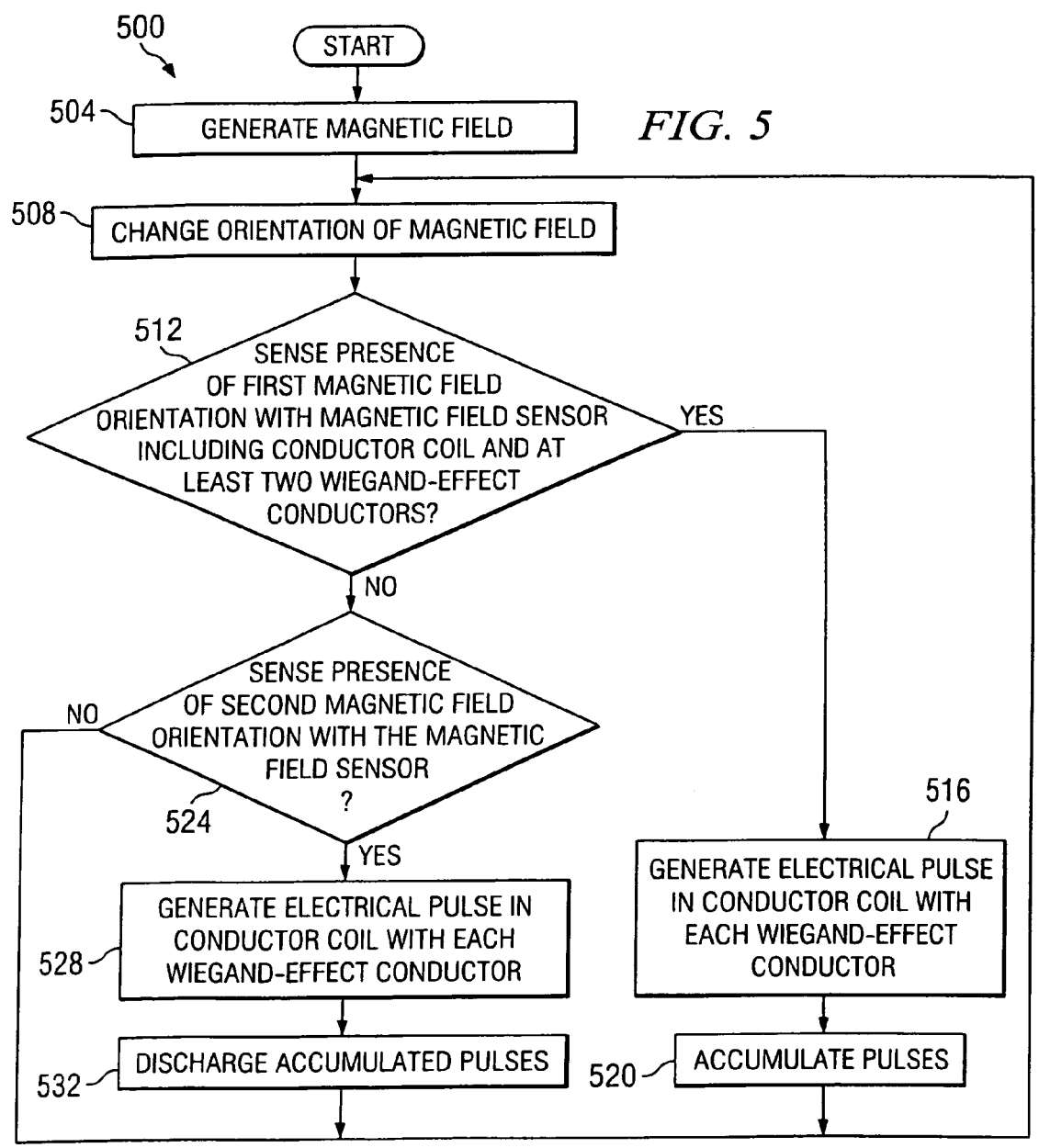
FIG. 5 is a flow chart illustrating one example of a procedure for process measurement.

FIG. 5 illustrates a procedure 500 for process measurement. Procedure 500 may, for example, exemplify the operations of system 100.

Procedure 500 begins with generating a magnetic field (operation 504). The magnetic field may, for example, be generated by a ferromagnetic device or a device that induces a magnetic field (e.g., a solenoid). The magnetic field may be generated throughout procedure 500.

The procedure continues with changing the orientation of the magnetic field (operation 508). Changing the orientation of the magnetic field may, for example, be accomplished by changing the orientation of a ferromagnetic device or changing the direction of the current flow in a device that induces a magnetic field. The orientation of the magnetic field may be changed throughout procedure 500.

The procedure calls for determining whether the presence of a first magnetic field orientation is sensed with a magnetic field sensor that includes a conductor coil and at least two Wiegand-effect conductors (operation 512). If the presence of the first magnetic field orientation is sensed, procedure 500 calls for generating an electrical pulse in the conductor coil with each Wiegand-effect conductor (operation 516) and accumulating the pulses (operation 520). The pulses may, for example, be accumulated by a capacitor. The procedure calls for continuing to change the orientation of the magnetic field (operation 508).

If the presence of the first magnetic field orientation is not sensed, however, procedure 500 calls for determining whether the presence of a second magnetic field orientation is sensed with the magnetic field sensor (operation 524). If the presence of the second magnetic field orientation is not sensed, procedure 500 calls for continuing to change the orientation of the magnetic field (operation 508). If, however, the presence of the second magnetic field orientation is sensed, the procedure calls for generating an electrical pulse in the conductor coil with each Wiegand-effect conductor (operation 528) and discharging the accumulated pulses based on these electrical pulses (operation 532). The electrical pulses generated in response to the second orientation may, for example, be opposites of the pulses generated in response to the first orientation and may discharge a capacitor holding a charge produced by the pulses. The procedure calls for continuing to change the orientation of the magnetic field (operation 508).

Although FIG. 5 illustrates one implementation of a procedure for process measurement, other procedures may have fewer, additional, and/or a different arrangement or operations. For example, the pulses may not be accumulated. This may, for instance, occur if a pulse is consumed as it is generated. In this implementation, the successive pulses may act as a correlation of the first pulse. As another example, sensing the first orientation and the second orientation of the magnetic field may occur in any order. As an additional example, the electrical pulses generated in response to the second magnetic field orientation may also be accumulated.

A number of implementations have been described, and various other implementations have been mentioned or suggested. Moreover, various additions, deletions, substitutions, and/or modifications to these implementations may be readily suggested to those of skill in the art while still achieving process measurement. For these reasons, the invention is to be measured by the following claims, which may encompass one or more of the implementations.

The invention claimed is:

1. A system for process measurement, the system comprising:
    a magnetic field generating system, the magnetic field generating system operable to generate a magnetic field and successively change an orientation of the magnetic field;
    a magnetic field sensor operably positioned to sense the presence of at least a first orientation of the magnetic field as the magnetic field orientation is changed by the magnetic field generating system, the magnetic field sensor comprising at least two Wiegand-effect conductors operably positioned relative to an associated conductor to each generate an electrical pulse in the associated conductor when the first orientation of the magnetic field is sensed; and
    a storage device coupled to the magnetic field sensor, the storage device operable to accumulate the electrical pulses generated by the at least two Wiegand-effect conductors sensing the first magnetic field orientation, wherein the electrical pulses from at least two of the Wiegand sensors combine to form a single output pulse signal.

2. The system of claim 1, wherein the magnetic field generating system comprises:
    a magnetic field generator, the magnetic field generator operable to generate the magnetic field; and
    a driving element coupled to the magnetic field generator, the driving element operable to change the orientation of the magnetic field generator.

3. The system of claim 2, wherein:
    the magnetic field generator comprises a polarized ring magnet; and
    the magnetic field sensor is located within the polarized ring magnet.

4. The system of claim 2, wherein the driving element comprises an impeller shaft for a gas meter.

5. The system of claim 4, wherein the magnetic field generator is mounted transversally to the shaft.

6. The system of claim 1, wherein:
the associated conductor comprises a coiled conductor; and
the Wiegand-effect conductors are positioned within the coiled conductor.

7. The system of claim 1, wherein the storage device comprises a capacitor.

8. The system of claim 1, wherein:
the magnetic field sensor is operable to sense the presence of a second orientation of the magnetic field as the magnetic field orientation is changed by the magnetic field generating system and to generate an electrical pulse in the associated conductor with each Wiegand-effect conductor when the second orientation of the magnetic field is sensed; and
the storage device is discharged by at least one of the pulses generated by the sensing of the second orientation of the magnetic field.

9. The system of claim 8, wherein the first orientation and the second orientation are opposites.

10. A method for process measurement, the method comprising:
generating a magnetic field;
successively changing an orientation of the magnetic field;
sensing the presence of at least a first orientation of the magnetic field with a magnetic field sensor comprising a conductor and at least two Wiegand-effect conductors as the magnetic field orientation is changed;
generating an electrical pulse in the conductor with each Wiegand-effect conductor when the first orientation of the magnetic field is sensed; and
accumulating the electrical pulses generated by the at least two Wiegand-effect conductors sensing the first orientation of the magnetic field, wherein the electrical pulses from at least two of the Wiegand sensors combine to form a single output pulse signal.

11. The method of claim 10, wherein successively changing the orientation of the magnetic field comprises changing the orientation of a magnetic field generator.

12. The method of claim 10, further comprising:
sensing the presence of a second orientation of the magnetic field with the magnetic field sensor as the magnetic field orientation is changed;
generating an electrical pulse in the conductor with each Wiegand-effect conductor when the second orientation of the magnetic field is sensed; and
discharging the accumulated pulses in response to at least one of the pulses generated by the sensing of the second orientation of the magnetic field.

13. A system for process measurement, the system comprising:
means for generating a magnetic field;
means for successively changing an orientation of the magnetic field;
means for sensing the presence of at least a first orientation of the magnetic field with a magnetic field sensor comprising at least two Wiegand-effect conductors as the magnetic field orientation is changed;
means for generating an electrical pulse with each Wiegand-effect conductor when the first orientation of the magnetic field is sensed; and
means for accumulating the pulses generated by the at least two Wiegand-effect conductors sensing the first orientation of the magnetic field, wherein the electrical pulses from at least two of the Wiegand sensors combine to form a single output pulse signal.

14. The system of claim 13, wherein successively changing the orientation of the magnetic field comprises changing an orientation of a magnetic field generator.

15. The system of claim 13, further comprising means for discharging the accumulated pulses in response to at least one pulse generated by the sensing of a second orientation of the magnetic field.

16. A system for process measurement, the system comprising:
a magnetic field generator operable to generate a polar magnetic field;
a driving element coupled to the magnetic field generator, the driving element operable to cyclically change an orientation of the magnetic field generator;
a magnetic field sensor operably positioned to sense the presence of at least a first and a second orientation of the magnetic field as the magnetic field orientation is changed, the magnetic field sensor comprising at least two Wiegand-effect conductors operably positioned in a coiled conductor to each generate an electrical pulse in the coiled conductor when the first orientation and when the second orientation of the magnetic field is sensed; and
a storage device coupled to the magnetic field sensor, the storage device operable to accumulate the electrical pulses generated by the at least two Wiegand-effect conductors, wherein the electrical pulses from at least two of the Wiegand sensors combine to form a single output pulse signal.

17. A method for monitoring rotation, the method comprising:
receiving a plurality of current pulses generated in response to exposure of a corresponding plurality of Wiegand sensors to a time-varying magnetic field;
accumulating the received current pulses in a capacitive circuit, wherein the current pulses from at least two of the Wiegand sensors combine to form a single output pulse signal of substantially greater amplitude than any one of the current pulses being combined; and
delivering the output pulse signal to an output node.

18. The method of claim 17, further comprising detecting the received current pulses by comparing the output pulse signal at the output node to a predetermined threshold.

19. The method of claim 17, wherein the output pulse signal has a substantially greater duration than any one of the current pulses being combined.

20. The method of claim 17, wherein the time-varying magnetic field corresponds to rotation of a rotating member.

21. The method of claim 20, wherein the rotating member is in a gas meter.

22. The method of claim 17 further comprising:
detecting a pattern of the current pulses to identify data encoded by an arrangement of the plurality of Wiegand sensors.

23. The method of claim 22 further comprising:
identifying a system comprising the plurality of Wiegand sensors based upon the encoded data.

24. A method for monitoring rotation, the method comprising:
receiving a plurality of current pulses generated in response to exposure of a corresponding plurality of Wiegand sensors to a time-varying magnetic field;
accumulating the received current pulses in a capacitive circuit, wherein the current pulses from at least two of the Wiegand sensors combine to form a single output pulse signal of substantially greater duration than any one of the current pulses being combined; and delivering the output pulse signal to an output node.

25. The method of claim 24, further comprising detecting the received current pulses by comparing the output pulse signal at the output node to a predetermined threshold.

26. The method of claim 25, wherein the output pulse signal has a substantially greater amplitude than any one of the current pulses being combined.

27. The method of claim 25 further comprising detecting a pattern of the current pulses to identify data encoded by an arrangement of the plurality of Wiegand sensors.

28. The method of claim 27 further comprising identifying a system comprising the plurality of Wiegand sensors based upon the encoded data.

29. The method of claim 24, wherein the time-varying magnetic field corresponds to rotation of a rotating member.

30. The method of claim 29, wherein the rotating member is in a gas meter.

31. A system for monitoring rotation, the system comprising:
   a plurality of Wiegand sensors arranged to generate a corresponding plurality of current pulses in response to the plurality of Wiegand sensors being exposed to a time-varying magnetic field; and
   a storage circuit operable to accumulate the plurality of current pulses generated by the plurality of Wiegand sensors, wherein the current pulses from at least two of the Wiegand sensors combine to form a single output pulse signal.

32. The system of claim 31, further comprising a gas meter, wherein the plurality of Wiegand sensors are disposed within the gas meter.

33. The system of claim 31, wherein the system is configured to combine current pulses received from at least two of the plurality of Wiegand sensors in the storage circuit to form a single output pulse of substantially greater amplitude than any one of the current pulses being combined.

34. The system of claim 33, further comprising a detector to identify output pulses based upon a comparison of a voltage signal in the storage circuit to a predetermined threshold.

35. The system of claim 31, wherein the system is configured to combine current pulses received from at least two of the plurality of Wiegand sensors in the storage circuit to form a single output pulse of substantially greater duration than any one of the current pulses being combined.

36. The system of claim 35, further comprising a detector to identify output pulses based upon a comparison of a voltage signal in the storage circuit to a predetermined threshold.

37. The system of claim 31, wherein the storage circuit comprises a capacitive circuit.

38. The system of claim 31, further comprising a magnetic field generating system, the magnetic field generating system operable to generate the magnetic field and configured to allow for the variation of the magnetic field with respect to the plurality of Wiegand sensors.

39. The system of claim 38, wherein the magnetic field generating system comprises a polarized ring magnet.

* * * * *